US012337350B2

(12) United States Patent
Bönsch et al.

(10) Patent No.: US 12,337,350 B2
(45) Date of Patent: Jun. 24, 2025

(54) CORRECTING MISPLACEMENTS ON A SORTER ELEMENT

(71) Applicant: Körber Supply Chain Logistics GmbH, Constance (DE)

(72) Inventors: Wolfgang Bönsch, Stockach (DE); Marco Fischer, Constance (DE)

(73) Assignee: KÖRBER SUPPLY CHAIN LOGISTICS GMBH, Constance (DE)

( * ) Notice: Subject to any disclaimer, the term of this patent is extended or adjusted under 35 U.S.C. 154(b) by 0 days.

(21) Appl. No.: 18/559,711

(22) PCT Filed: Jul. 25, 2022

(86) PCT No.: PCT/EP2022/070740
§ 371 (c)(1),
(2) Date: Nov. 8, 2023

(87) PCT Pub. No.: WO2023/051973
PCT Pub. Date: Apr. 6, 2023

(65) Prior Publication Data

US 2024/0226962 A1 Jul. 11, 2024

(30) Foreign Application Priority Data

Sep. 30, 2021 (EP) .................................... 21200259

(51) Int. Cl.
*B07C 5/02* (2006.01)
*B07C 5/04* (2006.01)

(52) U.S. Cl.
CPC .................. *B07C 5/02* (2013.01); *B07C 5/04* (2013.01); *B07C 2501/0054* (2013.01); *B07C 2501/0063* (2013.01)

(58) Field of Classification Search
CPC ..... B07C 5/02; B07C 5/04; B07C 2501/0054; B07C 2501/0063; B65G 47/53; B65G 65/23
USPC .............................................................. 209/1
See application file for complete search history.

(56) References Cited

U.S. PATENT DOCUMENTS 10,668,506 B2 * 6/2020 Erden .................... B65G 47/96
10,906,188 B1 * 2/2021 Sun ...................... B25J 15/0616
11,802,008 B2 * 10/2023 Christen .............. B65G 47/525
(Continued)

FOREIGN PATENT DOCUMENTS

EP 3566982 B1 9/2020
WO 2018/200503 A1 11/2018

OTHER PUBLICATIONS

European Patent Office; International Search Report; Oct. 17, 2022; entire document.

*Primary Examiner* — Michael McCullough
*Assistant Examiner* — Jessica L Burkman
(74) *Attorney, Agent, or Firm* — Price Heneveld LLP

(57) ABSTRACT

A system for correcting a misplacement of piece goods on a sorter element, that includes a robot and a detection device, wherein the detection device includes a sensor system and a control device and is to store a data structure which indicates a placement of the piece goods on the sorter element and to detect a misplacement of the piece goods on the sorter element on the basis of the data structure, and wherein the control device is configured to control the robot such that the latter corrects the misplacement of the piece goods on the sorter element.

18 Claims, 3 Drawing Sheets

(56) References Cited

U.S. PATENT DOCUMENTS

2023/0294134 A1* 9/2023 Grupp ..................... B07C 5/02
700/223

* cited by examiner

CORRECTING MISPLACEMENTS ON A SORTER ELEMENT

BACKGROUND

The invention relates to the technical field of eliminating a misplacement of a piece good on a sorter element.

Shipments or other general cargo are sorted automated through sorting devices. Typically, one piece good at a time is placed on the receiving area of a carrier or segment of a sorter by means of induction or manually. The sorter is designed to place one item at a time on one of a plurality of receiving areas and to transport each of the unit loads to any one of several sorting destinations. Typically, the sorter is a conveyor line that transports the carriers, and thus the receiving areas, to sorting destinations located along the conveyor line. The carriers comprise usually a dropping mechanism, for example a cross belt or a tipping tray, from which the respective piece goods are dropped directly from the respective receiving area at an automatically determined sorting target.

If goods are located between two segments or receiving areas of a classic sorter, they cannot be discharged in a controlled manner. In such a case, the segments are stored as blocked for further use by the sorter control system. Sorter capacity and sorter throughput decreases steadily until the goods are removed. Incorrectly positioned goods can also detach themselves from time to time and fall off the sorter, which can pose a danger to people.

For example, other sorting devices are based on a plurality of Automated Guided Vehicles (AGVs), wherein each AGV comprises a carrier with a receiving area and a drop mechanism. The AGVs can thus carry unit loads on the receiving area, transport them individually to the sorting destinations and drop them into the respective sorting destinations. If a unit load is lying on the frame of the AGV or is not sufficiently reliable on the receiving area, the problem is similar to that with classical sorters.

Usually, the problem described above is countered by occasionally removing consignments that have been left lying around and cleaning is performed at the end of each shift. On the one hand, such maintenance is personnel-intensive; on the other hand, it does not prevent the full capacity from being ensured again only after a maintenance cycle.

A loading control device can also be used to detect whether segments are empty or occupied.

A further possibility is to remove the sorter by means of a blower, in particular from misplaced light shipments. EP3566982A1 discloses a fan-based solution.

Several AGVs can also be coupled mechanically or virtually behind each other and thus be transported to the sorting destinations comparable to a train composition, and thus comparable to a classic sorter.

Further, EP3041615B1 discloses a method for feeding articles to a sorter from a stream of objects arriving at a feeder.

The invention is based on the object of optimizing the throughput of a sorting device and increasing its operational reliability.

SUMMARY OF THE INVENTION

According to one aspect, the invention relates to a method for correcting a misplacement of a piece good on a sorter element. The sorter element comprises a receiving area and is configured to receive the piece goods in a receiving area, to transport it to any one of a number of sorting destinations, and deliver it from the receiving area to the desired sorting destination. According to the method, a piece good is placed on the sorter element. A data structure, which indicates a placement of the piece good on the sorter element is automatically detected. A misplacement of the piece good on the sorter element is automatically detected on the basis of the data structure. A robot is controlled in such a way that the misplacement of the piece good on the sorter element is corrected by the robot.

According to another aspect, the invention relates to a system for correcting a misplacement of a piece good on a sorter element. The system comprises a robot and a detection device. The detection device comprises a sensor system and a control device and is set up to detect a data structure representing a placement of the piece goods on the sorter element and to detect a misplacement of the piece goods on the sorter element on the basis of the data structure. The control device is designed to control the robot in such a way that it corrects the misplacement of the piece goods on the sorter element.

Advantages and embodiments of the invention, which can be used individually or in combination with one another are the subject of the subclaims.

The data structure can, for example, be a digital image of the piece goods and/or comprise at least parts of the sorter element.

The sorter element may, for example, comprise a sorter or part of a sorter. The sorter element can also be designed as an AGV or composition of several AGVs.

The robot may be assigned exclusively or primarily to correct the misplacement. Alternatively, the robot can be assigned the task of correcting misplacements on the sorter element as a secondary task, while it has another main task, for example loading the sorter element with piece goods.

According to one embodiment, the robot remedies the misplacement by picking up the piece goods and delivering them to a subsequent free receiving area of the sorter element, for example to a following free receiving area of a sorter or to the receiving area of a following AGV.

According to one embodiment, the misplacement comprises, that the piece goods have not been placed or have not been placed completely in the receiving area. For example, the control device can be set up to use the data structure to determine whether the piece good has not been placed or has not been placed completely in the receiving area of the sorter element. This makes it possible to automatically identify a cause that particularly frequently leads to a reduction of sorter throughput.

According to one embodiment, the misplacement comprises, that the piece goods have not or not completely been placed in the receiving area. This can prevent the piece goods from falling off the side of the sorter element or from colliding with a person or equipment positioned along a conveying path along which the sorter element conveys the piece goods.

According to one embodiment, the misplacement comprises that the receiving area is only used for receiving a single piece good, but is occupied by two or more piece goods. This can further increase the reliability and throughput of the sorting process. For example, it can also be prevented that two piece goods with a double occupancy with different destinations cannot be discharged into the same sorting destination, and one of the piece goods would therefore be sorted incorrectly.

According to an embodiment example, the misplacement causes of the piece goods that the piece goods obstruct a regular ejection mechanism of the sorter element due to jamming or sticking. As a result, the receiving area can be released again for further shipments.

According to one embodiment, the misplacement comprises that the piece goods protrude laterally beyond the sorter element laterally to a conveying direction of the sorter element. This can increase operational reliability and throughput.

According to one embodiment, the misplacement comprises that the piece goods exceed a size intended for the sorter element. This can increase operational reliability and throughput.

According to one embodiment, the misplacement comprises that the piece goods are garbage or fragments of piece goods to be conveyed. This can increase operational reliability and throughput.

According to one embodiment, the misplacement is eliminated by moving the piece goods into the receiving area by means of the robot. For example, the control device can be set up to control the robot in such a way that it corrects the misplacement of the piece goods on the sorter element by moving the piece goods into the receiving area. This has the advantage that the piece goods can then be processed without further feeding through the sorter element, which has a positive effect on the throughput.

According to one embodiment, the data structure is checked by the control device for criteria, and on the basis of the checked criteria, the control device selects a method by means of which the misplacement is corrected. This allows a flexible, adapted to the respective type of misplacement and/or type of piece goods, correction of the misplacement.

For example, the method may be selected from any selection of at least two of the following methods:

- correcting the misplacement by means of the robot;
- moving the piece goods by means of the robot into the receiving area;
- discharging the piece goods from the sorter element by means of the robot;
- discharging the piece goods by a discharge mechanism of the sorter element (e.g. discharge by means of a tilt tray or a crossbelt belt movement);
- combination of placement of the piece goods by means of the robot with discharge of the piece goods by means of a delivery mechanism of the sorter element;
- signalling that correcting the misplacement is to be done by human intervention.

According to one embodiment, the robot is stationary or independently movable of the sorter element. For example, the robot is not or not so fixed to the sorter element that the robot would be transported together with piece goods by means of the sorter element. This allows a simple construction of the robot.

According to one embodiment, the robot is arranged above a conveying surface of the sorter element so that the sorter element loaded with the piece goods can pass the robot unhindered at least when no misplacement of the piece goods on the sorter element has been detected, and that when a misplacement of the piece goods on the sorter element has been detected, the robot can remedy the misplacement of the piece goods on the sorter element. This enables a simple construction and arrangement of a robot so that it can be moved as effectively as possible to all positions necessary to correct the misplacement of the piece goods on the sorter element.

According to an embodiment, the data structure also includes at least one topography information of the piece goods, and the topography information is taken into account by the control device to control the robot to correct the misplacement of the piece goods on the sorter element.

According to one embodiment, the sorter element comprises several receiving areas, each of which is intended to receive a piece good, to transport it to any one of several sorting destinations and to discharge it from the receiving area into one of the sorting destinations. For example, the sorter element is a sorter and comprises a plurality of receiving areas which are similar to a train composition, move in a conveying direction, and are arranged in at least one linear row in the conveying direction.

According to further embodiments, the system may include a plurality of robots, which are controlled by the control device or by further control devices in such a way that the robots correct the misplacement of piece goods on sorter elements. According to further embodiments, the robots may be provided with different manipulation tools, such as any selection of the following tools, to address misplacement of piece goods:

- gripper or pliers;
- vacuum suction cup (single suction cup, multiple suction cup);
- slider;
- broom;
- blower.

BRIEF DESCRIPTION OF THE DRAWINGS

Further features, characteristics and advantages of the present invention will be apparent from the following description with reference to the accompanying figures. Therein show schematic.

DETAILED DESCRIPTION

Figure 1:
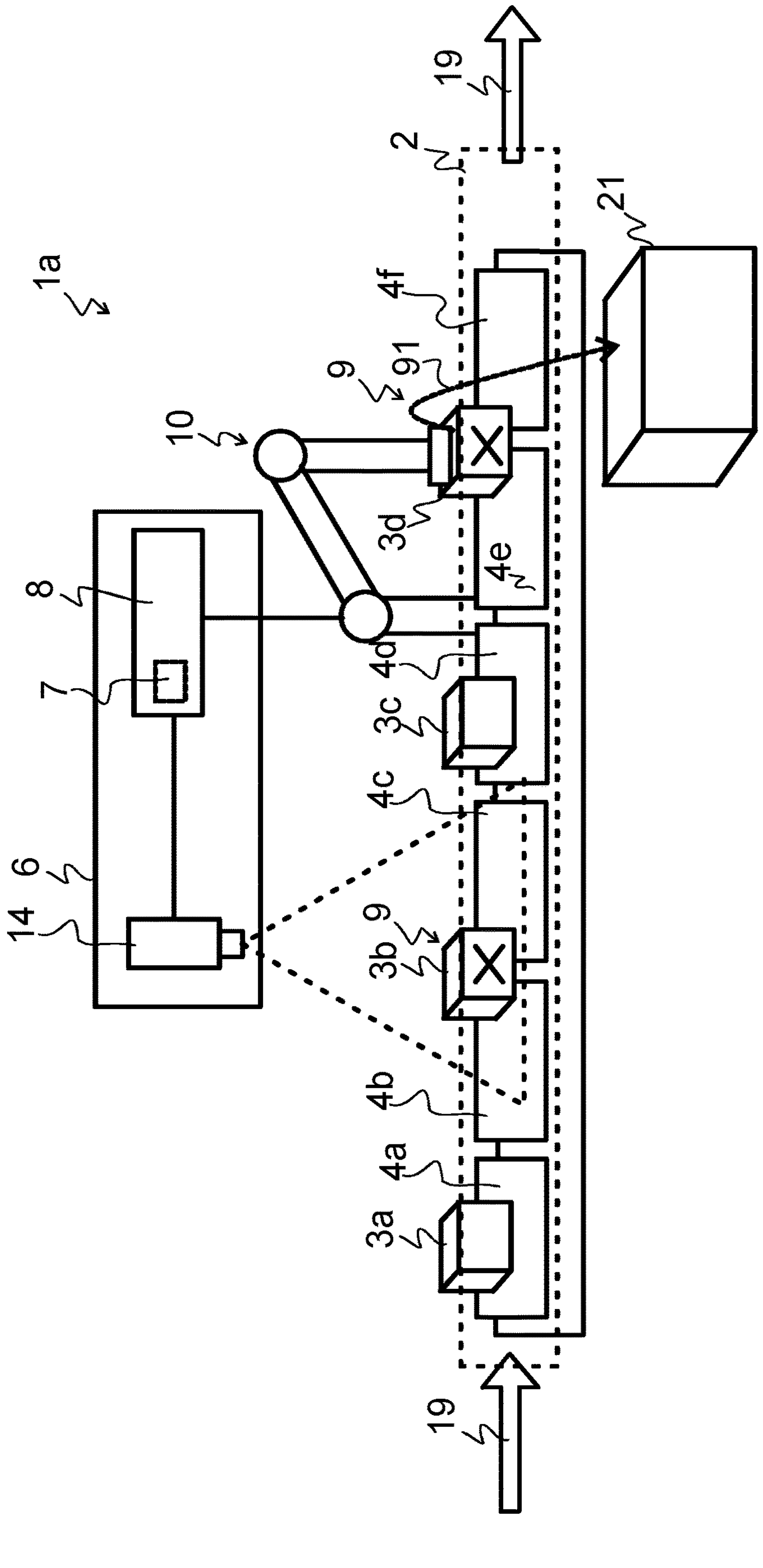
FIG. 1 shows a system for correcting a misplacement of a piece good on a sorter element according to an embodiment.
Figure 2:
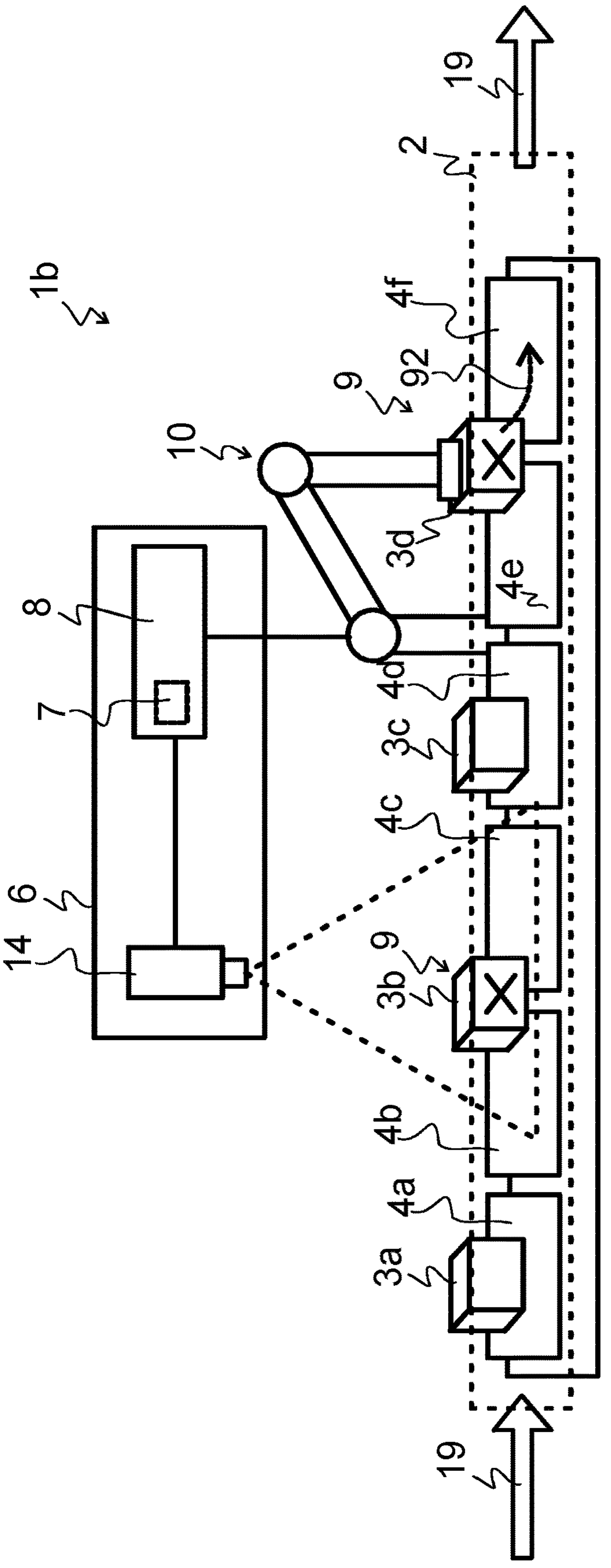
FIG. 2 shows a variant of a system for correcting a misplacement of a piece good on a sorter element according to an embodiment.
Figure 3:
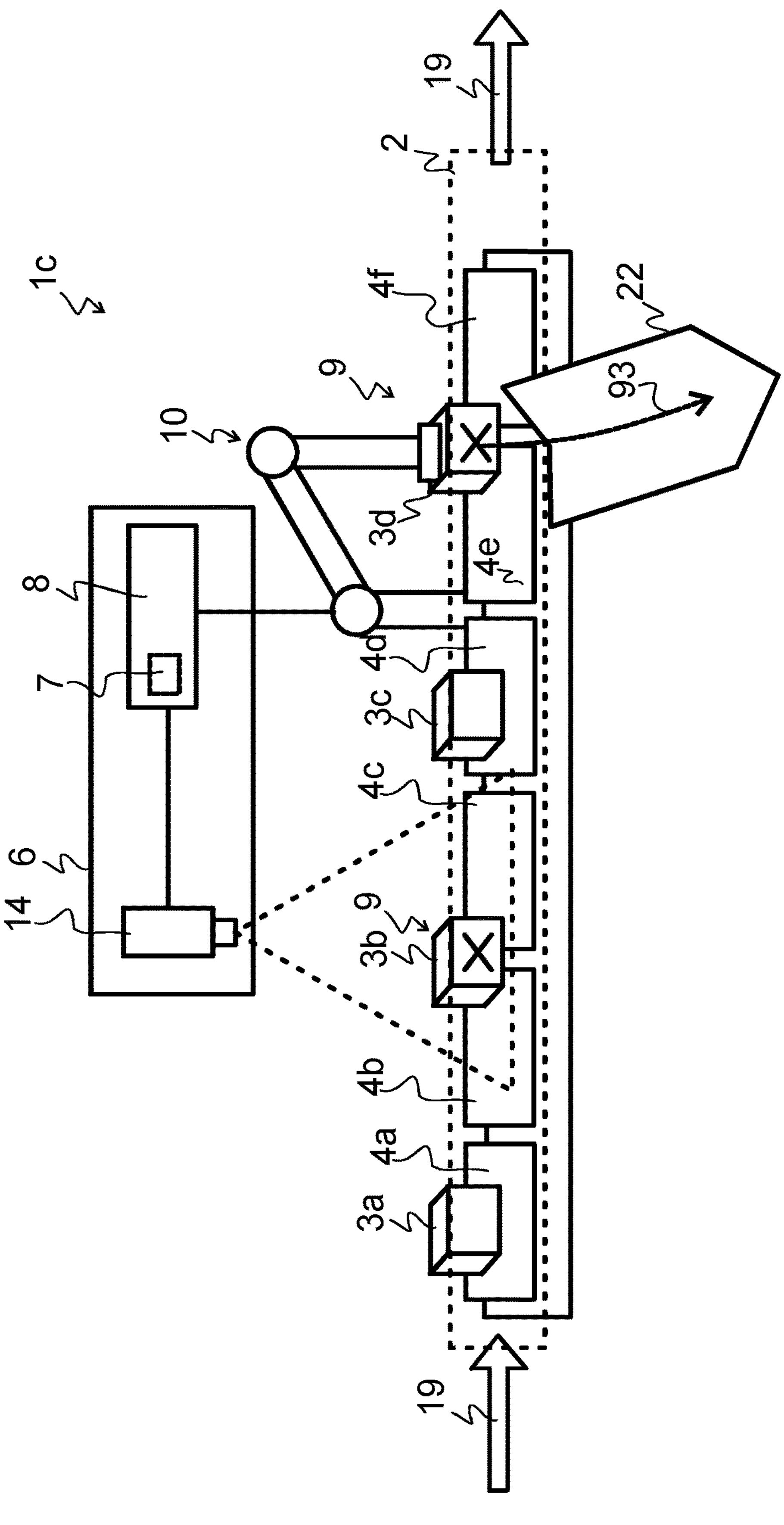
FIG. 3 shows another variant of a system for correcting a misplacement of a piece good on a sorter element according to an embodiment.

FIGS. 1 to 3 each show a sorting system in the form of a designed system 1 according to various embodiments, which, however, can also be combined with each other. In order to better address the systems 3 shown in FIGS. 1-3, they are indexed with the letters a, b, c, i.e. systems 1*a*, 1*b*, 1*c*.

FIG. 1 shows a system 1*a* designed as a sorting system for correcting a misplacement 9 of piece goods 3, on a sorter element 2 designed as a sorter. The piece goods 3 are indexed with letters in the figures for better understanding and identification, i.e. 3*a*, 3*b*, 3*c*, 3*d*. The system 1*a* comprises the sorter 2, a detection device 6 and a robot 10 mounted next to and above the sorter 2. The detection device 6 comprises a sensor system 14 designed as a camera system and a control device 8. The camera system 14 is set up to detect a data structure 7 designed as image data, which represents a placement of the piece goods 3 on the sorter element 2. The control device 8 is designed to detect a misplacement 9 of the piece goods 3 on the sorter element 2 on the basis of the data structure 7. The control device 8 is also designed to control the robot 10 on the basis of the data structure 7 in such a way that the robot 10 corrects the misplacement 9 of the piece goods 3 on the sorter element 2.

The sorter 2 is or comprises a conveyor line 2, which includes a plurality of receiving areas 4 defined by cross belt conveyors which are indexed with the letters a to f for better understanding, i.e. 4*a*, 4*b*, 4*c*, 4*d*, 4*e*, 4*f*. Each of these receiving areas 4*a*, 4*b*, 4*c*, 4*d*, 4*e*, 4*f* comprises a cross belt conveyor and is intended to receive preferably exactly one piece good 3 to be sorted.

In FIG. 1, it can be seen that the piece goods 3*b*, 3*d* are at least partially placed between two adjacent receiving areas 4, and thus are not placed in such a way that the cross belt conveyors can reliably drop these piece goods 3*b*, 3*d* at a desired sorting destination. The piece goods 3*b*, 3*d* are thus not completely placed in a receiving area 4 of the sorter element 2 and thus represent misplacements.

The camera 14 captures image data from each of the piece goods 3*a*, 3*b*, 3*c*, 3*d* conveyed in the conveying direction 19 and sends this data as a captured data structure 7 to the control device 8. The control device 8 evaluates the data structures 7 for each piece good 3 and checks them for criteria. On the basis of the checked criteria, the control device 8 decides whether or not a misplacement has occurred. In the embodiment shown in FIG. 1, the control device 8 controls the robot 10 to discharge misplaced piece goods 3*b*, 3*d* into a container 21 by means of a method 91, while correctly placed piece goods 3*a*, 3*b* are further transported by the sorter 2 in the conveying direction 19 (not shown), and are discharged by means of the cross belts if the sorting target is suitable.

The criteria may even be such that the control device 8 selects a method by means of which the misplacement 9 is corrected. Possible methods can include, for example:

a) correcting the misplacement 9 by means of the robot 10;

b) moving the piece goods 3 by means of the robot 10 into the receiving area 4;

c) discharging the piece goods 3 from the sorter element 2 by means of the robot 10;

d) discharging the piece goods 3 by a discharge mechanism of the sorter element 2;

e) combination of placement of piece goods 3 by means of the robot 10 with discharge of the piece goods 3 by a discharge mechanism of the sorter element 2;

f) signaling that correcting the misplacement 9 to be made by human intervention;

g) no correction of a misplacement.

FIG. 2 shows a variant of the embodiment illustrated in FIG. 1, wherein the system 1*b* of FIG. 2 differs from system 1 in that a misplacement 9 is corrected by moving the piece good 3 into the receiving area 4 by means of the robot 10. The control device 9 can be set up in such a way that each of the misplaced piece goods 3 is moved into a free receiving area 4. Alternatively, it can also be decided individually for each misplaced piece goods 3 by the control device 8 on the basis of criteria whether this method 92 or another method, for example method 91 is used Preferably, the image data of the data structure 7 are also used to determine topographical information of the piece goods 3, which is also taken into account by the control device 8 to control the robot 10. In this way, a misplacement of the piece goods 3 on the sorter element 2 can be corrected more precisely.

In FIG. 3, in contrast to FIG. 1, misplaced piece goods 3*b*, 3*d* by means of a method 93 via a chute 22 is ejected laterally from the sorter 2, which has the advantage of gentler handling of the piece goods.

Other advantageous embodiment examples can be realized as follows:

According to one embodiment example, the detection device is designed as an optical recognition system and monitors the placement of all items on the sorter and verifies the position of the items on the sorter and measures their exact positions. The optical recognition system may include sensors and/or cameras and generate two-dimensional or three-dimensional representations of the monitored area.

According to one embodiment example, incorrect assignments are detected using defined criteria. The criteria can also be taught in on the basis of sample images. If necessary, the criteria can also include a targeted evaluation of segments blocked by the sorter control.

According to one embodiment example, a decision is determined by the control device 8 as to which method is likely to be used to eliminate false occupancy:

robots;

drop with usual method (tilt tray, crossbelt belt movement);

combination of robotic arm with usual dropping Mechanics;

only possible through human interaction;

no false occupancy discernible.

According to an embodiment example, the robot at the belt the robot receives information from the recognition system about faulty occupancy, this may include:

shipment type (material, size, shape);

exact position;

possible gripping or manipulation point as 3D-coordinate with surface normal vector;

drop point (chute, bin, correct position on sorter segment).

According to one embodiment example, the robot 10 is mounted above the sorter 2 and the cross belts or tilt trays in such a way that it does not interfere with the normal operation of the sorter 2, but can reach all relevant positions.

According to further embodiment examples, different robot kinematics are conceivable (kick arm, swivel arm, delta) depending on the sorter and shipment spectrum. For example, the robot can be designed as a gantry robot.

According to further embodiments, the robot arm can be equipped with various tools:

gripper or pliers;

vacuum suction cup (single suction cup, multiple suction cup);

slider;

broom;

blower.

According to further embodiments, the system 1 is designed in such a way that if the robot has to move a piece good 3 only slightly, the misplacement can be remedied with the usual regular discharge method by means of a cross belt or a tilting tray of the conveyor 2.

According to further embodiment examples, the robot is so fast that it can operate at 2.5 to 4.0 m/s during sorter operation.

According to further embodiments, a slower operating mode is necessary.

According to further embodiment examples, the detection device 6 can estimate from an estimated time to correct the mis-occupancies when a maintenance run is worthwhile in order to restore the full capacity of the sorter.

According to further embodiment examples, the detection device 6 can check the success of an attempt to correct the misplacement after exactly one sorter cycle and, if necessary, correct the misplacement again using the same or a different method.

According to further embodiment examples, the system can support manual sorter maintenance if remaining misplacements that can only be remedied by human interaction are driven directly to the service personnel one after the other.

According to further embodiment examples, the robot can also be equipped with brushes or other manipulators for automatic cleaning of the sorter element 2, or of tilt trays or cross belts.

According to further embodiment examples, not only misplaced piece goods, but also packaging fragments, package contents and other unwanted objects can be removed.

According to further embodiment examples, it is also possible to remove piece goods that are correctly placed but cannot be removed with the usual ejection mechanism for other reasons (stuck, ejection mechanism defective, item rolling or too sluggish for mechanism).

According to further embodiments, the detection device 8 comprises an intelligent recognition system for the identification, measurement and evaluation of faulty occupancy with a memory for repeated attempts to correct the situation and/or an interface to sorter control.

Further advantages and embodiments result from any selection of the following concepts:
- precise manipulation does not require complete idling of the sorter and can be performed at full/reduced speed during operation;
- less/no staffing;
- faster sorter maintenance, can be performed several times a day if necessary
- reduction of sorter malfunctions and personal hazards;
- increase sorter throughput;
- recognition system replaces previous loading control camera;
- previous loading control function can be extended by further features (exact location of shipments, statistics, contamination detection);
- heavy shipments cannot be removed with the blowers used so far;
- removing heavy shipments very unergonomic and possibly dangerous work;
- by regularly removing misplaced items, they can be returned to the sorting process more quickly, which increases delivery quality and shortens delivery times;
- less noise than with pure blower.

Although the invention has been illustrated and described in more detail by preferred embodiment examples, the invention is not limited by the examples disclosed. Variations thereof may be derived by the skilled person without departing from the scope of protection of the invention as defined by the following patent claims.

The invention claimed is:

1. A method for correcting a misplacement of piece goods on a sorter element, comprising:
- placing the piece goods on the sorter element, wherein the sorter element comprises a receiving area and is configured to receive the piece goods in the receiving area to transport the piece goods to any one of a plurality of sorting destinations and there to deliver the piece goods from the receiving area to the any one of the plurality of sorting destination;
- automatically detecting a data structure representing a placement of the piece goods on the sorter element;
- automatically detecting a misplacement of the piece goods on the sorter element via the data structure;
- controlling a robot such that the misplacement of the piece goods on the sorter element is eliminated by the robot.

2. The method according to claim 1, wherein the misplacement is remedied by moving at least one of the piece goods via the robot into the receiving area.

3. The method according to claim 2, wherein the misplacement comprises that the piece goods have not been placed or have not been placed completely in the receiving area, and/or that the receiving area is provided for receiving only one piece good but is occupied by two or more piece goods, and/or that the misplacement of the piece goods causes the piece goods to obstruct a regular discharge mechanism of the sorter element due to jamming or sticking, and/or that the piece goods laterally to a conveying direction of the sorter element protrudes laterally beyond the sorter element, and/or that the piece goods exceed a size intended for the sorter element and/or that the piece goods are garbage.

4. The method according to claim 3, wherein the data structure is automatically checked for criteria, and a method is automatically selected on the basis of the checked criteria via which the misplacement is corrected; and
- wherein the method is automatically selected to include at least two of the following methods comprising:
- correcting the misplacement via the robot;
- moving the piece goods via the robot into the receiving area;
- ejecting the piece goods from the sorter element via the robot;
- discharging the piece goods by a discharge mechanism of the sorter element; and
- combination of placement of the piece goods via the robot with discharge of the piece goods by a discharge mechanism of the sorter element.

5. The method according to claim 1, wherein the robot is stationary or movable independently of the sorter element.

6. The method according to claim 1, wherein the robot is arranged above a conveying surface of the sorter element such that the sorter element loaded with the piece goods at least then if no misplacement of the piece goods on the sorter element has been detected, such that the robot can pass unhindered, and such that the robot can correct the misplacement of the piece goods on the sorter element if a misplacement of the piece goods on the sorter element has been detected.

7. The method according to claim 1, wherein the data structure also includes a topography information of the piece goods, and wherein the topography information is taken into account in order to control the robot to correct the misplacement of the piece goods on the sorter element.

8. The method according to claim 1, wherein the misplacement comprises that the piece goods have not been placed or have not been placed completely in the receiving area, and/or that the receiving area is provided for receiving only one piece good but is occupied by two or more piece goods, and/or that the misplacement of the piece goods causes the piece goods to obstruct a regular discharge mechanism of the sorter element due to jamming or sticking, and/or that the piece goods laterally to a conveying direction of the sorter element protrudes laterally beyond the sorter element, and/or that the piece goods exceed a size intended for the sorter element and/or that the piece goods are garbage.

9. The method according to claim 1, wherein the data structure is automatically checked for criteria, and a method is automatically selected on the basis of the checked criteria via which the misplacement is corrected; and wherein the method is automatically selected to include at least two of the following methods comprising:

correcting the misplacement via the robot;

moving the piece goods via the robot into the receiving area;

ejecting the piece goods from the sorter element via the robot;

discharging the piece goods by a discharge mechanism of the sorter element; and combination of placement of the piece goods via the robot with discharge of the piece goods by a discharge mechanism of the sorter element.

10. A system for correcting a misplacement of a piece good on a sorter element, comprising:

a robot; and a detection device comprising a sensor system and a control device and that is configured to detect a data structure which represents a placement of the piece goods on the sorter element and to recognize a misplacement of the piece goods on the sorter element on the basis of the data structure;

wherein the control device is configured to control the robot such that the robot corrects the incorrect placement of the piece goods on the sorter element.

11. The system according to claim 10, wherein the control device is configured to determine, on the basis of the data structure, whether the piece goods have not been placed or have not been placed completely in a receiving area of the sorter element, and/or whether the receiving area is only intended to receive a single piece good but is occupied by two or more piece goods, and/or whether the misplacement of the piece goods causes the piece goods to obstruct a regular discharge mechanism of the sorter element due to jamming or sticking, and/or whether the piece goods protrudes laterally beyond the sorter element with respect to a conveying direction of the sorter element, and/or whether the piece goods exceed a size intended for the sorter element, and/or whether the piece goods are garbage.

12. The system according to claim 11, wherein the control device is further configured to control the robot such that the robot corrects the misplacement of the piece goods on the sorter element by moving the piece goods into the receiving area.

13. The system according to claim 12, wherein the control device is further configured to check the data structure for criteria and, based on the checked criteria, to select a method by which the misplacement is corrected; and wherein the control device is configured to select the method to includes at least two of the following methods comprising:

correcting the misplacement via the robot;

moving the piece goods via the robot into the receiving area;

discharging the piece goods from the sorter element via the robot;

discharging the piece goods by a discharge mechanism of the sorter element; and combination of placement of the piece goods via the robot with discharge of the piece goods by a discharge mechanism of the sorter element.

14. The system according to claim 10, wherein the robot is stationary or movable independently of the sorter element.

15. The system according to claim 10, wherein the robot is arranged above a conveying surface of the sorter element such that the sorter element loaded with the piece goods can pass the robot unhindered at least when no misplacement of the piece goods on the sorter element has been detected, and the robot can correct the misplacement of the piece goods on the sorter element when a misplacement of the piece goods on the sorter element has been detected.

16. The system according to claim 10, wherein the detection device is arranged to detect at least one piece of topographical information of the piece goods and wherein the control device takes the at least one piece of topographical information into account in order to control the robot to detect the misplacement of the piece goods on the sorter element.

17. The system according to claim 10, wherein the sorter element comprises a plurality of receiving areas each of which is provided to receive a piece good and to discharge it into a respective one of the sorting destinations.

18. The system according to claim 10, wherein the control device is further configured to check the data structure for criteria and, based on the checked criteria, to select a method by which the misplacement is corrected; and wherein the control device is configured to select the method to includes at least two of the following methods comprising:

correcting the misplacement via the robot;

moving the piece goods via the robot into the receiving area;

discharging the piece goods from the sorter element via the robot;

discharging the piece goods by a discharge mechanism of the sorter element; and combination of placement of the piece goods via the robot with discharge of the piece goods by a discharge mechanism of the sorter element.

* * * * *